Patented May 27, 1941

2,243,171

UNITED STATES PATENT OFFICE 2,243,171

VULCANIZATION ACCELERATOR

Robert L. Sibley, Nitro, W. Va., assignor to Monsanto Chemical Company, St. Louis, Mo., a corporation of Delaware No Drawing. Application December 23, 1937, Serial No. 181,368

10 Claims. (Cl. 260—793)

The present invention relates to a new and improved class of rubber vulcanization accelerators, to a process of vulcanizing rubber or a rubber containing material, and to the vulcanized rubber products obtained with the aid of said new and improved vulcanization accelerators.

The accelerators of the present invention are the products obtainable by reacting a cyclohexylamine with an aldehyde and further reacting the product so obtained with carbon bisulfide. The use of products obtained by reacting certain amines with an aldehyde and further reacting the product so formed with carbon bisulfide is well-known to the rubber vulcanization art and some of the accelerators employed by the trade are of this type. The use of the accelerators of the present invention, however, represents an improvement over the prior art. As illustrative of this improvement the product obtained by reacting N-methyl cyclohexylamine first with formaldehyde and then reacting the aldehyde-amine with carbon bisulfide has been found on testing to give a faster cure at a lower temperature than the amine-aldehyde, carbon bisulfide reaction products heretofore employed, as for example piperidine reacted with formaldehyde and further reacted with carbon bisulfide. Further advantages of the preferred class of accelerators will be apparent from the examples hereinafter shown.

Typical examples of cyclohexylamines which may be employed in the preparation of the new and preferred class of accelerators are cyclohexylamine, N-methyl cyclohexylamine, N-ethyl cyclohexylamine N-butyl cyclohexylamine, N-amyl cyclohexylamine, dicyclohexylamine, N-benzyl cyclohexylamine, N-hexahydro benzyl cyclohexyl amine, N-methyl, methyl cyclohexylamine and N-ethyl, ethyl cyclohexylamine.

A cyclohexylamine as illustrated above may be reacted with an aldehyde, preferably formaldehyde, and then with carbon bisulfide to form the new and preferred class of accelerators. Examples of aldehydes which may be so employed are formaldehyde, acetaldehyde, and their polymeric forms, propionaldehyde, butylaldehyde, iso valeric aldehyde, acrolein aldehyde, croton aldehyde, aldol, benzaldehyde, cinnamic aldehyde and furfuraldehyde.

As a specific embodiment which is intended to be illustrative of the invention and not limitative of the scope thereof, one of the preferred class of accelerators was prepared from N-ethyl cyclohexylamine. 64 parts by weight of N-ethyl cyclohexylamine (substantially 0.5 molecular proportion) and 28 parts by weight of approximately 37% formaldehyde (substantially 0.28 molecular proportion) were mixed together in a suitable container, keeping the temperature of the mixture below 15° C., and stirred for one hour. The mixture was then allowed to stand overnight at room temperature at which time it had separated into two layers. The water layer was removed and the oil residue dried over anhydrous sodium sulfate. 19 parts by weight (substantially 0.25 molecular proportion) of carbon bisulfide were then added to the above described oil. The reaction took place immediately and the desired reaction product was obtained as a clear yellow oil.

As a further specific example of the invention N-methyl cyclohexylamine was reacted in a manner analogous to that described above. 57 parts by weight (substantially 0.5 molecular proportion) of N-methyl cyclohexylamine and 28 parts by weight of approximately 37% formaldehyde (substantially 0.28 molecular proportion) were mixed together in a suitable container. The temperature of the mixture was kept below 15° C. and the mixture was stirred for one hour and allowed to stand until it had separated into two layers. The water layer was removed and the residue dried over anhydrous sodium sulfate and treated with 19 parts by weight (substantially 0.25 molecular proportion) of carbon bisulfide. The ensuing reaction was immediate and vigorous, the temperature rising rapidly from 15° C. to 30° C. The desired reaction product was thereby obtained as a viscous oil. An analysis for sulfur in the reaction product gave an average of 20.55% and for nitrogen an average of 8.75%.

The above described materials prepared from N-methyl cyclohexylamine and N-ethyl cyclohexylamine were compounded into a rubber latex mix as follows:

| | Stock | |
|---|---|---|
| | A | B |
| Rubber as 60% latex | 100 | 100 |
| Zinc oxide | 1 | 1 |
| Sulfur | 1.5 | 1.5 |
| Reaction product of N-ethyl cyclohexylamine and formaldehyde, further reacted with carbon bisulfide | 0.47 | |
| Reaction product of N-methyl cyclohexylamine and formaldehyde, further reacted with carbon bisulfide | | 0.45 |

The rubber mixes so compounded were poured on glass to form films and the films dried in air three days at room temperature after which the dry films were cured in air at 70° C. and also in water at 100° C. The following modulus and tensile properties were found on testing the cured rubber products.

Table I

Cured in air at 158° F. (70° C.).

| Cure | | Modulus of elasticity in lbs./in.² at elongations of— | | Tensile at break in lbs./in.² | Ult. elong., percent |
|---|---|---|---|---|---|
| Stock | Time in minutes | 500% | 700% | | |
| A | Uncured | 640 | 2470 | 6130 | 930 |
| B | Uncured | 720 | 2900 | 6280 | 910 |
| A | 10 | 630 | 2450 | 6190 | 935 |
| B | 10 | 690 | 2820 | 6200 | 905 |
| A | 20 | 640 | 2430 | 6160 | 935 |
| B | 20 | 700 | 2860 | 6050 | 900 |
| A | 30 | 600 | 2450 | 6060 | 930 |
| B | 30 | 730 | 2810 | 6220 | 905 |
| A | 50 | 630 | 2440 | 6020 | 930 |
| B | 50 | 740 | 2830 | 6230 | 910 |
| A | 70 | 620 | 2460 | 6190 | 935 |
| B | 70 | 760 | 2970 | 6470 | 900 |
| A | 90 | 600 | 2450 | 6190 | 940 |
| B | 90 | 770 | 3000 | 6550 | 910 |

Table II

Cured in water at 100° C.

| Cure | | Modulus of elasticity in lbs./in.² at elongations of— | | Tensile at break in lbs./in.² | Ult. elong., percent |
|---|---|---|---|---|---|
| Stock | Time in minutes | 500% | 700% | | |
| A | Uncured | 600 | 2200 | 6030 | 940 |
| B | Uncured | 690 | 2700 | 6360 | 900 |
| A | 3 | 610 | 2220 | 6280 | 945 |
| B | 3 | 710 | 2720 | 6430 | 900 |
| A | 5 | 600 | 2110 | 5920 | 925 |
| B | 5 | 720 | 2740 | 6180 | 885 |
| A | 10 | 610 | 2120 | 6070 | 930 |
| B | 10 | 710 | 2740 | 6400 | 885 |
| A | 15 | 590 | 2210 | 6080 | 920 |
| B | 15 | 720 | 2770 | 5950 | 850 |
| A | 20 | 600 | 2220 | 6070 | 915 |
| B | 20 | 740 | 2790 | 5960 | 855 |
| A | 40 | 610 | 2290 | 5750 | 880 |
| B | 40 | 810 | 2930 | 5800 | 845 |

The above data show the accelerating properties of the preferred class of materials, for example the reaction product of N-methyl cyclohexylamine and formaldehyde further reacted with carbon bisulfide, when employed in an aqueous rubber dispersion. The data show that the new accelerators are very fast, flat-curing accelerators. Thus the three day drying at room temperature has resulted in a "set-up" of the rubber stock and said drying alone produced a high modulus and tensile stock from which it is evident that the new class of accelerators are active at temperatures even below 70° C. The modulus and tensile properties remain nearly constant after curing in air at 70° C. and in water at 100° C. as shown.

As further specific embodiments of the invention, other typical examples of the preferred class of materials were prepared wherein the amine was initially reacted with the aldehyde and the product so formed further reacted with carbon bisulfide. Thus, by the method hereinbefore described N-ethyl cyclohexylamine was reacted with butylaldehyde and carbon bisulfide and N-benzyl cyclohexylamine was reacted with formaldehyde and carbon bisulfide. The proportions of the reactants employed were substantially two molecular proportions of amine, one molecular proportion of aldehyde and an excess over one molecular proportion of carbon disulfide, the excess being removed from the final product. Where convenient or desirable other proportions of the reactants may be employed and other means of carrying out the reactions. For example, other temperatures than those mentioned in the examples may be employed.

The products so obtained and in addition the product prepared from N-methyl cyclohexylamine were incorporated into a typical rubber stock comprising:

| | Stock | | |
|---|---|---|---|
| | C | D | E |
| Smoked sheets | 100 | 100 | 100 |
| Zinc oxide | 5 | 5 | 5 |
| Sulfur | 3.0 | 3.0 | 3.0 |
| Stearic acid | 0.5 | 0.5 | 0.5 |
| Reaction product of N-methyl cyclohexylamine and formaldehyde further reacted with carbon bisulfide | 0.7 | | |
| Reaction product of N-ethyl cyclohexylamine and butylaldehyde further reacted with carbon bisulfide | | 0.7 | |
| Reaction product of N-benzyl cyclohexylamine and formaldehyde further reacted with carbon bisulfide | | | 0.7 |

The stocks so compounded were vulcanized at the temperature of 5 pounds steam pressure per square inch and the following modulus and tensile properties obtained on testing the cured rubber product.

Table III

| Cure | | Modulus of elasticity in lbs./in.² at elongations of— | | Tensile at break in lbs./in.² | Ult. elong., percent |
|---|---|---|---|---|---|
| Stock | Time in minutes | 300% | 500% | | |
| C | 10 | 140 | 250 | 2725 | 900 |
| D | 10 | 95 | 165 | 1800 | 940 |
| E | 10 | 115 | 230 | 2325 | 920 |
| C | 20 | 185 | 415 | 3850 | 840 |
| D | 20 | 155 | 315 | 2700 | 880 |
| E | 20 | 150 | 360 | 3525 | 885 |
| C | 30 | 225 | 590 | 4500 | 805 |
| D | 30 | 185 | 375 | 3150 | 830 |
| E | 30 | 190 | 420 | 3950 | 850 |
| C | 60 | 360 | 1300 | 4550 | 690 |
| D | 60 | 290 | 850 | 3825 | 720 |
| E | 60 | 260 | 720 | 4400 | 780 |

The above data show that the preferred class of accelerators give a fast cure at the temperature of five pounds of steam pressure per square inch.

As further specific embodiments of the invention dicyclohexylamine was reacted with formaldehyde and the product so formed reacted with carbon bisulfide; cyclohexylamine was reacted with formaldehyde and the product so formed reacted with carbon bisulfide; cyclohexylamine was reacted with acetaldehyde and the product so formed reacted with carbon bisulfide and the materials so prepared found on testing in a typical rubber stock to exhibit desirable accelerating properties.

The present invention is not limited to the specific examples hereinbefore set forth wherein the preferred accelerators are employed. Other proportions of the reactants may be employed in the preparation of the preferred class of accelerators, for example an excess of either one or both the aldehyde and carbon bisulfide may be utilized and any unreacted materials removed by any convenient means from the final product.

Other ratios of the compounding ingredients than those mentioned in the examples as well as other well-known fillers, pigments and the like may be employed in the production of various types of rubber compounds and are apparent to those skilled in the art to which the invention pertains. The present invention is limited solely by the following claims.

What is claimed is:

1. The process of vulcanizing rubber or a rubber containing material which comprises heating rubber, or a rubber containing material, and sulfur in the presence of a product obtained by reacting a mono N-alkyl cyclohexylamine containing one hydrogen atom on the amino nitrogen atom with an aldehyde in the ratio of substantially two molecular proportions of amine and one of aldehyde, and further reacting the product so obtained with carbon bisulfide.

2. The process of vulcanizing rubber which comprises heating rubber and sulfur in the presence of a product obtained by reacting a mono N-alkyl cyclohexylamine containing one hydrogen atom on the amino nitrogen atom with formaldehyde in the ratio of substantially two molecular proportions of amine and one of formaldehyde and further reacting the product so obtained with carbon bisulfide.

3. The process of vulcanizing rubber which comprises heating rubber and sulfur in the presence of a product obtained by reacting N-methyl cyclohexylamine with an aldehyde in the ratio of substantially two molecular proportions of amine and one of aldehyde and further reacting the product so obtained with carbon bisulfide.

4. The process of vulcanizing rubber which comprises heating rubber and sulfur in the presence of a product obtained by reacting N-methyl cyclohexylamine with formaldehyde in the ratio of substantially two molecular proportions of amine and one of formaldehyde and further reacting the product so obtained with carbon bisulfide.

5. The process of vulcanizing rubber which comprises heating rubber and sulfur in the presence of a product obtained by reacting N-ethyl cyclohexylamine with formaldehyde in the ratio of substantially two molecular proportions of amine and one of formaldehyde and further reacting the product so obtained with carbon bisulfide.

6. The vulcanized rubber product obtained by heating rubber or a rubber containing material and sulfur in the presence of a product obtained by reacting a mono N-alkyl cyclohexylamine containing one hydrogen atom on the amino nitrogen atom with an aldehyde in the ratio of substantially two molecular proportions of amine and one of aldehyde and further reacting the product so obtained with carbon bisulfide.

7. The vulcanized rubber product obtained by heating rubber and sulfur in the presence of a product obtained by reacting a mono N-alkyl cyclohexylamine containing one hydrogen atom on the amino nitrogen atom with formaldehyde in the ratio of substantially two molecular proportions of amine and one of formaldehyde and further reacting the product so obtained with carbon bisulfide.

8. The vulcanized rubber product obtained by heating rubber and sulfur in the presence of a product obtained by reacting N-methyl cyclohexylamine with an aldehyde in the ratio of substantially two molecular proportions of amine and one of aldehyde and further reacting the product so obtained with carbon bisulfide.

9. The vulcanized rubber product obtained by heating rubber and sulfur in the presence of a product obtained by reacting N-methyl cyclohexylamine with formaldehyde in the ratio of substantially two molecular proportions of amine and one of formaldehyde and further reacting the product so obtained with carbon bisulfide.

10. The vulcanized rubber product obtained by heating rubber and sulfur in the presence of a product obtained by reacting N-ethyl cyclohexylamine with formaldehyde in the ratio of substantially two molecular proportions of amine and one of formaldehyde and further reacting the product so obtained with carbon bisulfide.

ROBERT L. SIBLEY.